United States Patent [19]

Miller

[11] Patent Number: 5,012,220
[45] Date of Patent: Apr. 30, 1991

[54] SOLAR POWERED PAGING DEVICE

[76] Inventor: Moses Miller, c/o Ralph Hutchinson, 26400 Southfield Rd., Lathrup Village, Mich. 48076

[21] Appl. No.: 416,957
[22] Filed: Oct. 4, 1989
[51] Int. Cl.⁵ ............................................. H04Q 1/30
[52] U.S. Cl. ........................... 340/311.1; 340/825.44; 136/291
[58] Field of Search .......... 340/311.1, 825.44, 825.48; 455/343, 248; 362/183; 136/291; 320/2

[56] References Cited

U.S. PATENT DOCUMENTS

| | | | |
|---|---|---|---|
| 2,919,353 | 12/1959 | Paradise | 455/343 X |
| 2,951,163 | 8/1960 | Shaffer et al. | 455/343 X |
| 3,668,528 | 6/1972 | Hutchinson et al. | 340/311.1 X |
| 4,213,079 | 7/1980 | Mullersman | 320/2 |
| 4,293,808 | 10/1981 | Varadi et al. | 320/2 |
| 4,563,727 | 1/1986 | Curiel | 362/183 |
| 4,786,851 | 11/1988 | Fuji et al. | 320/2 |
| 4,962,522 | 10/1990 | Marian | 340/311.1 X |

OTHER PUBLICATIONS

"Solar Power for Electronic Products", The Bestek Hivod High Voltage Solar Device, 6–1985.

*Primary Examiner*—Joseph A. Orsino
*Assistant Examiner*—Brian R. Tumm
*Attorney, Agent, or Firm*—Gifford, Groh, Sprinkle, Patmore and Anderson

[57] ABSTRACT

A kit for providing solar power to a battery powered paging device. The kit includes a pair of mounting posts which are affixed to the pager and a module having strips of solar cells which is demountably attached to the mounting posts. The pair of strips of solar cells are attached in series to connecting terminal strips by biasing contact springs.

7 Claims, 1 Drawing Sheet

SOLAR POWERED PAGING DEVICE

BACKGROUND OF THE INVENTION

This invention relates to a solar powered paging device and in particular to a kit having a solar module for charging a battery powered pager.

DESCRIPTION OF THE PRIOR ART

Battery powered telephone pagers are known in the art. These telephone pagers are operable in response to a radio signal from a central paging unit to inform a user that a party is attempting to make telephone contact with the user. The pager produces a tone signal or displays a telephone number of the party attempting to reach the user. Currently known pagers are battery powered. The pager must be activated continuously in order to receive the paging signal. As a result, the batteries are frequently discharged, thus requiring replacement or recharging.

It is also known to use solar panels to charge batteries of electrical appliances such as calculators and radios. Solar panels may be either remote from the electrical device being charged or incorporated directly on the device, such as small calculators.

However, it would be advantageous to provide a solar powered module for charging the batteries of pagers. Currently existing solar modules are either too large and bulky for use with existing pagers or do not provide sufficient power. Additionally, it would be advantageous to produce a solar power charger which is adaptable for installation on paging units currently in use. Such a kit would preferably be small enough to be mounted directly on the pager and efficient enough to develop sufficient electrical voltage and charge the batteries of the pager.

SUMMARY OF THE INVENTION

The present invention relates to a kit for providing solar power to a battery powered paging device. The kit includes a pair of mounting posts which are affixed to the pager and a module having strips of solar cells. The module is demountably attached to the mounting posts. A pair of eye rivets secure the module to the posts and secure electrical conductive strips to the module. The eye rivets are adapted to receive the mounting posts within such that electrical current generated by solar cells within the solar power module is delivered to a battery through the mounting posts. Contact springs extend between the electrical contact strips and the solar cells which are mounted within a tray to electrically connect several solar cells in series to produce sufficient electrical voltage to charge the battery and produce a compact module. The tray and solar cells are sandwiched between the base, a housing and shock absorbing gasket to provide a thin efficient solar module which may be demountably attached to the mounting post.

The kit according to the invention provides a simple, compact, and efficient module, and permits quick and efficient adaptation of a conventional pager for use with the module.

These and other objects and advantages of the invention will be apparent from the following description and the accompanying drawings.

DETAILED DESCRIPTION OF THE PREFERRED EMBODIMENTS

Figure 1:
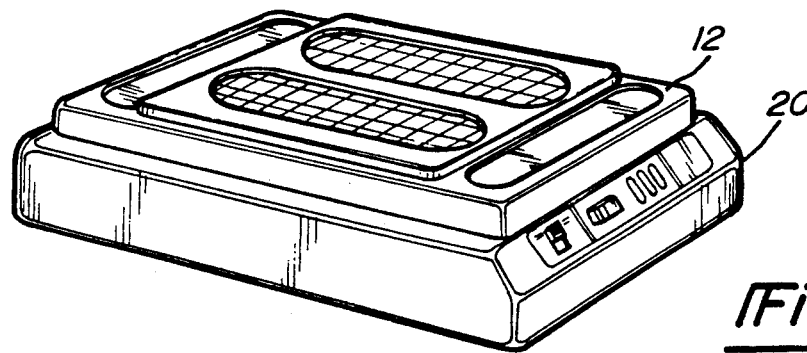
FIG. 1 is a perspective view of a kit with a module mounted in position on a pager in accordance with the invention.
Figure 2:
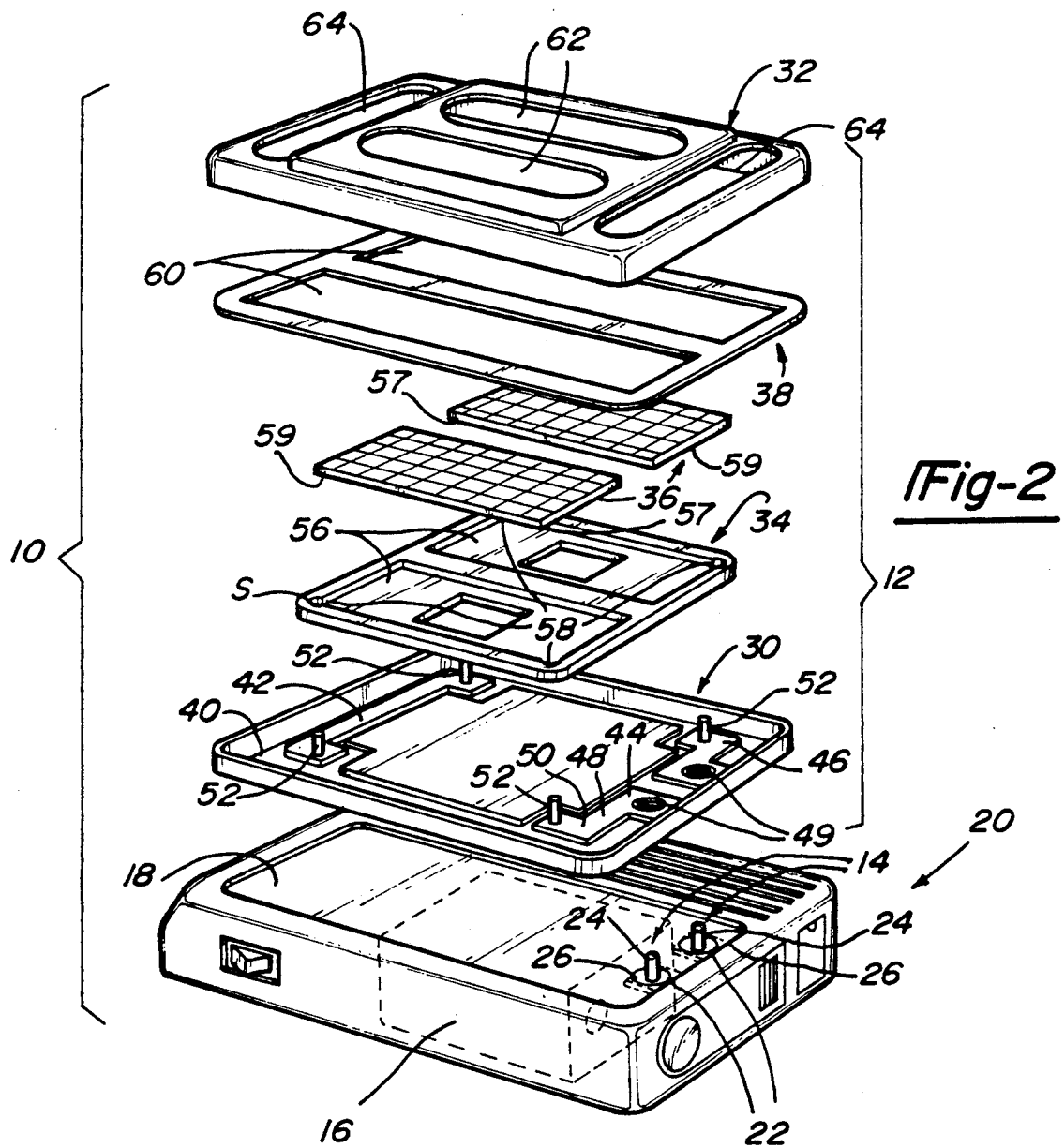
FIG. 2 is an exploded perspective view of the kit showing solar powered module and mounting post in position on the pager in accordance with the invention.

In FIG. 2, a kit 10 for adapting a conventional phone pager 20 for use with auxiliary solar power is shown. The kit 10 includes a solar power module 12 and pair of contact posts 14 which are mounted to the pager 20.

The pager 20 is of the type which may be clipped to a belt or pocket of the user and which responds to radio signals from a central paging station to provide a signal or indication that the user has a phone call waiting.

While the pager may be of any type powered by a battery 16, in the preferred embodiment a pager of the type manufactured by Motorola Corp. is used. The pager 20 has a generally flat rectangular top surface 18. A pair of spaced apart holes 22 are drilled through the top surface along a lower edge to accommodate the pair of mounting posts 14. The mounting posts 14 are formed of electrically conductive material such as metal and have an elongated portion 24 with a flange 26 at an end. The mounting posts are mounted from the inside of the pager 20 such that the elongated portion 24 extends through each hole 22 and the flange 26 abuts the inside of the pager to keep the post from pushing fully through the hole 22. A spacer (not shown) of a non-conductive material such as plastic is inserted behind the posts within the pager to prevent the posts from moving inwardly. A wire extends between each post and one terminal of the battery 16 to deliver power from the module 12.

As best shown in FIG. 2, the module has a base 30 and housing 32 between which are sandwiched a tray 34 supporting a pair of solar cells 36 and a gasket 38.

The base 30 has a generally rectangular shape, having a width and length slightly smaller than the width and length of the top surface 18 of the pager 10. The base may be formed of any suitable material such as ABS plastic. Affixed to an inner surface 40 of the base 30 are a connecting strip 42 and a pair of terminal strips 44 and 46. The pair of terminal strips are formed of electrically conductive material such as copper and are affixed to the inner surface of the base 30 by a pair of electrically conducting eye rivets 49. One terminal strip 44 is connected to a diode 48 which is further connected to an outer strip 50. As is known in the art, the diode prevents the solar module from drawing current from the battery while permitting current to be delivered from the solar cells to the battery. Extending along a side of the base opposite the eye rivets 49 is the connecting strip 42 of electrically conductive material such as copper. The connecting strip is affixed to the base in any suitable manner. The strip may be molded within the base or bonded as suitable resin to the base. The ends of the terminal strips and connecting strip are electrically connected to the solar cell strips 36 by four springs 52, as set forth more fully below. The contact springs 52 are soldered in position extending outwardly from the strips.

The tray 34 has a pair of rectangular indentations 56 dimensioned to receive the pair of solar cells 36 snugly within each indentation. The tray 34 has a generally rectangular shape and is dimensioned to rest on the base over the connecting strip 42 and terminal strips 44 and 46. Four bores 58 extend through outer corners of each indentation 56 of the tray for receiving the four contact springs 52 within. In this manner the tray 34 is positioned on the base 30. The tray 34 may be made of any suitable electrically non-conductive material such as plastic.

The pair of strips of solar cells 36 are mounted within the identations 56 of tray 34. In the preferred embodiment, the solar cells are conventional crystal or silicon type. However, other types of cells, such as the metallic or stainless steel cells may be used. Conventional solar cells of this type develop 0.5 volts and are connected together in series in strips to increase the voltage.

The two solar cell strips 36 of the preferred embodiment each generate about 3.5 volts of electricity, so that when the strips are connected together in series, the module will generate approximately 7.0 volts current when subjected to direct light. The ends of the solar strip are provided with positive 57 and negative 59 electrical contacts respectively on the bottom surface. When mounted within the tray the contacts are positioned over bores 58 of the tray 34 so that the springs 52 contact the strips.

The gasket 38 is formed having a width and length generally equal to that of the base 30. The gasket 38 has two openings 60 having the same dimensions as solar cell strips 36. The gasket may be formed of any suitable material such as rubber and is quite thin. The gasket is placed on top of the tray 34 and provides shock absorption to the solar cells when they are mounted within the module between the base 30 and housing 32.

The housing 32 is dimensioned to extend over the tray and solar cells and is affixed to the base 30. The housing may be formed of any suitable moldable material such as plastic. The housing has a pair of apertures 62 extending over each of the strips of solar cells 36 to permit light to contact the solar cells. Additionally a pair of indentations 64 are formed on the surface of the housing for affixation of name plates and the like. The housing is secured to the base over the tray and gasket in any suitable manner such as by glueing or heat-welding. When assembled, the contact springs are compressed to provide contact against the solar cells.

The module is mounted to the pager by pushing the elongated portion 24 of the contact mounting posts 14 through the rivet eyes 49. The rivet eyes are dimensioned to snugly and securely accept the mounting posts so that the module is held in position and electrical current generated by the solar cells is delivered through the terminals to the battery of the pager.

The kit may thus be used to convert existing pagers to solar power charging. The mounting posts are installed in the pager and wired to the battery. To complete the installation solar cells of the module are pushed onto the mounting posts. The module may be removed if desired for repair. Alternatively, the kit may be used with new pagers installed at the factory to provide the solar powered charging option.

The foregoing detailed description of the preferred embodiment has been given for clearness of understanding only, and no unnecessary limitations should be understood therefrom. Some modifications will be obvious to those skilled in the art to which the invention pertains, without deviation from the spirit of the invention as defined by the scope of the appended claims:

I claim:

1. A solar powered paging device having at least one battery, said paging device comprising:
    a pager;
    a module having at least one strip of solar cells, a pair of electrical contacts and means for electrically connecting said at least one strip to said pair of electrical contacts, said means for electrically connecting comprising at least two springs;
    means for demountably attaching said module to said pager, said means for attaching having a second means for electrically connecting said pair of electrical contacts to said at least one battery, said second means for electrically connecting including a pair of electrically conductive posts extending outwardly from said pager and means for receiving said posts, said means for receiving mounted to said module: and
    a tray for supporting said at least one solar module, said tray having means for receiving said at least one strip of solar cells;
    each of said at least two springs extending through a respective opening in said tray, said at least two springs extending between said electrical contacts and said at least one strip of solar cells.

2. A solar powered paging device having at least one battery, said paging device comprising:
    a pager;
    a module having at least one strip of solar cells, a pair of electrical contacts, means for electrically connecting said at least one strip to said pair of electrical contacts, and a tray for supporting said at least one solar module, said tray having means for receiving said at least one strip of solar cells;
    means for demountably attaching said module to said pager, said means for demountably attaching including a pair of electrically conductive posts extending outwardly from said pager; and
    said means for attaching having means for electrically connecting said pair of electrical contacts to said at least one battery, said means for connecting said at least one strip and said one pair of electrical contacts having at least two springs, each of said springs extending through a respective opening in said tray, said springs extending between said electrical contacts and said strip of solar cells.

3. The paging device of claim 2, wherein
said means for receiving said posts comprises a pair of eye rivets, each of said pair of rivets dimensioned to receive one of said pair of posts securely within.

4. The paging device of claim 2, wherein said module further comprises a diode mounted between said at least one strip of solar cells and one of said pair of electrical contacts.

5. The paging device of claim 2 wherein said module further comprises a gasket interposed between a tray and a housing to absorb shocks.

6. The paging device of claim 2, wherein said at least one strip of solar cells is a pair of strips.

7. The paging device of claim 6, wherein said each strip of solar cells produces at least 3.5 volts.

* * * * *